United States Patent [19]

Hall et al.

[11] 4,178,337
[45] Dec. 11, 1979

[54] THERMOPLASTIC ELASTOMERIC FILM EXTRUSION PROCESS

[75] Inventors: Joseph J. Hall; Ralf Korpman, both of Bridgewater; Stephen M. Sinker, Middlesex, all of N.J.

[73] Assignee: Johnson & Johnson, New Brunswick, N.J.

[21] Appl. No.: 843,110

[22] Filed: Oct. 18, 1977

[51] Int. Cl.² ............................ B29D 7/02; B29B 3/00
[52] U.S. Cl. ...................................... 264/28; 260/4 R; 260/4 AR; 260/5; 260/27 R; 260/27 EV; 260/27 BB; 260/28.5 R; 264/176 R; 264/211; 264/349
[58] Field of Search .................. 264/171, 349, 176 R, 264/211, 28, 40.1; 156/244

[56] References Cited

U.S. PATENT DOCUMENTS

| | | | |
|---|---|---|---|
| 2,622,469 | 12/1952 | Gray | 264/176 R |
| 2,702,410 | 2/1955 | Brown | 264/176 R |
| 3,783,072 | 1/1974 | Korpman | 260/29.7 R |
| 3,984,509 | 10/1976 | Hall et al. | 264/171 |

Primary Examiner—James B. Lowe
Attorney, Agent, or Firm—Alice O. Robertson; Charles A. Harris

[57] ABSTRACT

A single screw extrusion process for extruding a mixture of relatively high molecular weight thermoplastic elastomer particles and relatively low molecular weight resin particles, wherein the particulate mixture is supercooled and maintained at temperatures below that which would cause the mixture to agglomerate and stick to the screw until the axial driving forces on the mixture have increased to the extent they will overcome any tendency of the mixture to stick to the screw, thereby assuring steady state extrusion conditions.

5 Claims, 2 Drawing Figures

THERMOPLASTIC ELASTOMERIC FILM EXTRUSION PROCESS

The present invention relates to processes for producing adhesive tapes and sheets from thermoplastic elastomeric materials and generally to processes for producing films or sheets from thermoplastic elastomeric block copolymers without the use of solvents.

U.S. Pat. No. 3,783,072 discloses a single screw extrusion process for pressure-sensitive adhesive sheets and tapes wherein the extruder is charged with a blended mixture of dry thermoplastic elastomeric block copolymer particles and dry tackifier resin particles and the particles are melted in the extruder and laminated to a backing sheet as a hot drawn film without using solvents.

While the process of U.S. Pat. No. 3,783,072 has been responsible for a major breakthrough in the art of manufacturing pressure-sensitive adhesive products, difficulties have been encountered in practice due to nonuniform feeding, and surging or extrusion at nonuniform rates. This may result in undesirable variations in the dimensions and quality of the extrudate film and may even jam the extruder. This problem apparently relates to the use of a mixture of high and low molecular weight elastomer and resin particles and the fact that this mixture of high molecular weight block copolymer particles and low molecular weight resin particles tends to agglomerate and stick to the extruder screw as the screw rotates in the inlet portion of the feed section of the extruder.

In a single screw extruder feeding a particulate mixture, the mixture sticks or adheres to the inside surfaces of the barrel. As the screw rotates the mixture is, in a sense, scraped or wiped rotatively from the inside of the barrel by the rotating helical flights of the screw and caused to slide along the flights in such a way that the mixture can be said to have rotative and axial components of motion. Of course it is the axial component of motion which moves the mixture axially or lengthwise of the screw in the extruder barrel. It is believed that when a particulate mixture of this type, i.e., relatively high molecular weight thermoplastic elastomeric block copolymer particles and relatively low molecular weight resin particles, begins to agglomerate in the feed section of the extruder it tends to stick to the extruder screw as described above, and thereby loses its axial component of motion. Furthermore, the agglomerated mixture tends to fill up the screw channel between the flights in the feed section and thus clogs the extruder.

U.S. Pat. No. 3,984,509 discloses a process which overcomes this problem by mechanically displacing the mixture of high and low molecular weight elastomeric and resin particles rotatively with respect to the flights of the screw or wiping the mixture off the flights while causing the mixture to move axially forward in the extruder uniformly at a predetermined feed rate in the inlet portion of the feed section of the extruder. A short floating wiper screw meshing with the main screw in the feed section of the extruder is used for this purpose.

We have invented a single screw process for extruding such a mixture of particles which does not require mechanical blocking or wiping means for preventing agglomeration in the feed section of the extruder.

In the process of our invention the particulate mixture is supercooled so that the temperatures of the resin particles in the inlet portion of the feed section of the extruder remain below that which would cause the mixture to agglomerate and stick to the screw until the axial driving forces on the mixture have increased to the extent they will overcome any tendency of the mixture to stick to the screw.

As the mixture of high and low molecular weight particles is fed into the inlet portion of the feed section of the extruder it comes into contact with the hot extruder screw which consists of helical flights winding around, and extending radially outward from, an internally heated cylindrical core. Successive turns of the helical flights define a helical channel between them which is bounded radially inwardly by the heated core and radially outwardly by the inner cylindrical wall of the barrel of the extruder feed section. It is this channel which carries the particulate mixture and it is the helical flights of the screw which both scrape the particles off the barrel wall and drive them axially forward in the barrel. In single screw extruders of this type it is the particles in direct contact with the core and the driving surfaces of the helical flights of the screw which tend to become heated the most and therefore melt first. More precisely insofar as this invention is concerned, it is the low molecular weight lower melting point resin particles which melt first in these locations and begin to make the particulate mass viscous and sticky. In prior art single screw extruders of this type the heat from the screw combines with heat generated by shearing forces developed in the process to pass relatively quickly into the mass of mixed particles in the screw channel to cause the mass in the channel to become sticky and agglomerate in such a way that it "sticks to the screw", or rotates around with the screw without advancing axially forward. Even if this agglomeration does not completely jam the extruder it will cause highly undesirable surging or gross variations in the feed rate of the extruder. This is true even if the extruder barrel in the feed section is water cooled to 55° or 60° F. as is conventional in the industry in some types of plastics extrusion.

We now have discovered that this type of agglomeration can be prevented by (a) cooling the particulate mixture and (b) driving the cooled mixture axially forward with the screw and (c) maintaining the temperatures of the particles below that which would cause the mixture to agglomerate and stick to the screw until the axial driving forces on the mixture have increased to the extent they will overcome any tendency of the mixture to stick to the screw.

The particulate mixture is cooled, both by pre-cooling the mixture prior to feeding it into the inlet of the feed section of the extruder, and by cooling the feed section of the extruder barrel so as to remove heat rapidly from the mixture as it is driven axially forward in the barrel.

The mixture can be precooled in several ways. As a practical matter it is preferred to blend all of the constituents of the mixture and then refrigerate a batch of the blend preferably to a temperature at or below the freezing point of water. However, specially cooled or refrigerated blending system may be used for this purpose. Furthermore, the mixture may be precooled by supercooling only the low molecular weight low melting point resin particles prior to blending with the high molecular weight elastomeric particles. In this case it is preferred to blend the particles just prior to feeding them into the extruder. The supercooled resin particles, not only will tend to cool the elastomer particles, but also will remain an increment cooler than the elastomer for the period of time necessary to achieve the desired feeding characteristics. If only the resin particles are precooled as just described, it is important to reduce their temperature sufficiently to compensate for heat absorption by the resin particles when they are mixed with the elastomer particles.

According to our invention, the extruder barrel also is cooled adjacent the inlet portion of the feed section to a temperature approaching the freezing point of water to draw heat transmitted from the heated extruder screw away from the precooled particles. Preferably this portion of the barrel is cooled in such a way that its outer surface is maintained at a temperature of below about 5° C. This preferably is accomplished by coils within or around the barrel through which refrigerant is circulated. In general, it is preferred that the dry particulate mixture be precooled, prior to entering the feed section of the extruder, to a temperature approximately equal to or less than that of the inlet portion of the feed section of the extruder barrel.

The particulate mixture of this invention consists predominantly of a mixture of dry thermoplastic elastomer particles and about 20–300 parts of dry resin particles per one hundred parts by weight of the total elastomer particles. The elastomer particles possess a relatively high number average molecular weight, i.e., at least about 75,000, preferably at least about 100,000; whereas the resin particles have a relatively low number average molecular weight, i.e., preferably not above about 3,000 and normally have a melting point above about 60° C.

Preferably, the thermoplastic elastomer particles consist essentially of:

1. a linear or radial A-B-A block copolymer wherein the A blocks are derived from styrene and the B blocks are derived from a conjugated diene or a copolymer of ethylene and butylene, or 2. an A-B block copolymer wherein the A blocks are derived from styrene and the B blocks are derived from a conjugated diene, or 3. an ethylene vinyl acetate copolymer, or 4. a mixture of any of the copolymers from two or more of the catagories (1), (2), or (3) above.

However, minor amounts of more conventional diene rubber elastomers may be utilized if they can be reduced to extrudable condition. These include natural rubbers, synthetic rubbers based on butadiene, isoprene, butadiene-styrene and butadiene acrylonitrile, and butylrubber and other elastomers. Thus, at least a major amount of the elastomer particles consist of (1), (2), (3) or (4) above, (by weight of the total elastomer particles) whereas no more than minor amounts of the conventional diene rubber elastomers may be employed (also by weight of the total elastomer particles).

The A-B-A block copolymers useful in the elastomer particles of this invention may be linear or radial A-B-A block copolymers of the type which comprises an elastomeric B-block (center block) derived from a conjugated diene such as butadiene or isoprene, i.e., polymerized from butadiene, isoprene or the like, either alone or in conjunction with a small proportion of other monomers, or derived from a copolymer of ethylene and butylene; and thermoplastic A-blocks (end blocks) derived from styrene, i.e., polymerized from styrene or styrene homologues. The individual A-blocks have a number average molecular weight of at least about 7,000 preferably in the range of about 12,000–30,000, and the A-blocks preferably constitute about 5–50 percent by weight of the block copolymer.

The radial A-B-A polymers useful in this invention are of the type described in U.S. Pat. No. 3,281,383 and conform to the following general formula: $(A-B-)_nX$, wherein A is a thermoplastic block polymerized from styrene or styrene homologues, B is an elastomeric block polymerized from a conjugated diene such as butadiene or isoprene, X is an organic or inorganic connecting molecule, with a functionality of 2–4 as described in U.S. Pat. No. 3,281,383 or possibly with a higher functionality as described in the article entitled "New Rubber is Backed by Stars" appearing on page 35 of the June 11, 1975 issue of Chemical Week. "n" then is a number corresponding to the functionality of X.

The A-B block copolymers of this invention are of the type wherein the A-blocks are derived from styrene or styrene homologues and B-blocks are derived from conjugated dienes either alone or in conjunction with small proportions of other monomers. These A-B block copolymers are described in U.S. Pat. Nos. 3,519,585 and 3,787,531.

The dry resin particles of this invention may include hydrocarbon resins, such as the polymerized mixed olefin type, esters of hydrogenated rosin and stabilized rosin, polyterpene resins, certain phenolic resins, coumarone indene, alphamethyl styrene, and various other resins of the type generally disclosed in column 5 of U.S. Pat. No. 3,239,478.

Trace amounts of liquid components may be preblended into the polymer particles. However, the preferred technique is to pump any liquid components into the barrel beyond the feed section of the extruder. In this manner, liquid components such as oils, liquid tackifiers, or plasticizers may be added.

The process of this invention is adapted to produce a wide variety of products which may be formed from, or which may incorporate, a thermoplastic elastomeric film or sheet. The extruded thermoplastic elastomeric film or sheet of this invention normally is not above about 50 mils in thickness and preferably is below 20 mils thick; those below 10 mils in thickness being considered films and those above 10 mils in thickness being considered sheets. The film or sheet may be in the form of a self-supporting film which is adhesive or nonadhesive. If the former, it may be pressure-sensitive or normally tacky or it may be nontacky and heat sensitive. Since pressure-sensitive adhesives normally are coated on nontacky backing sheets, the process of this invention also may be used for extruding a film of pressure-sensitive adhesive and then laminating the adhesive while hot onto a backing sheet which, in turn, may be paper, polymeric film, foil, cloth or the like, and may contain reinforcing strands or other materials or may be laminated with several sheets or layers of the same or different materials. Various nontacky and nonadhesive extruded films or sheets of this invention also may be laminated in various ways with various sheet materials to form a variety to products according to this invention.

Other and further advantages of the process of this invention will appear to a person skilled in the art from the following description, examples and claims, taken together with the drawings wherein:

Figure 1:
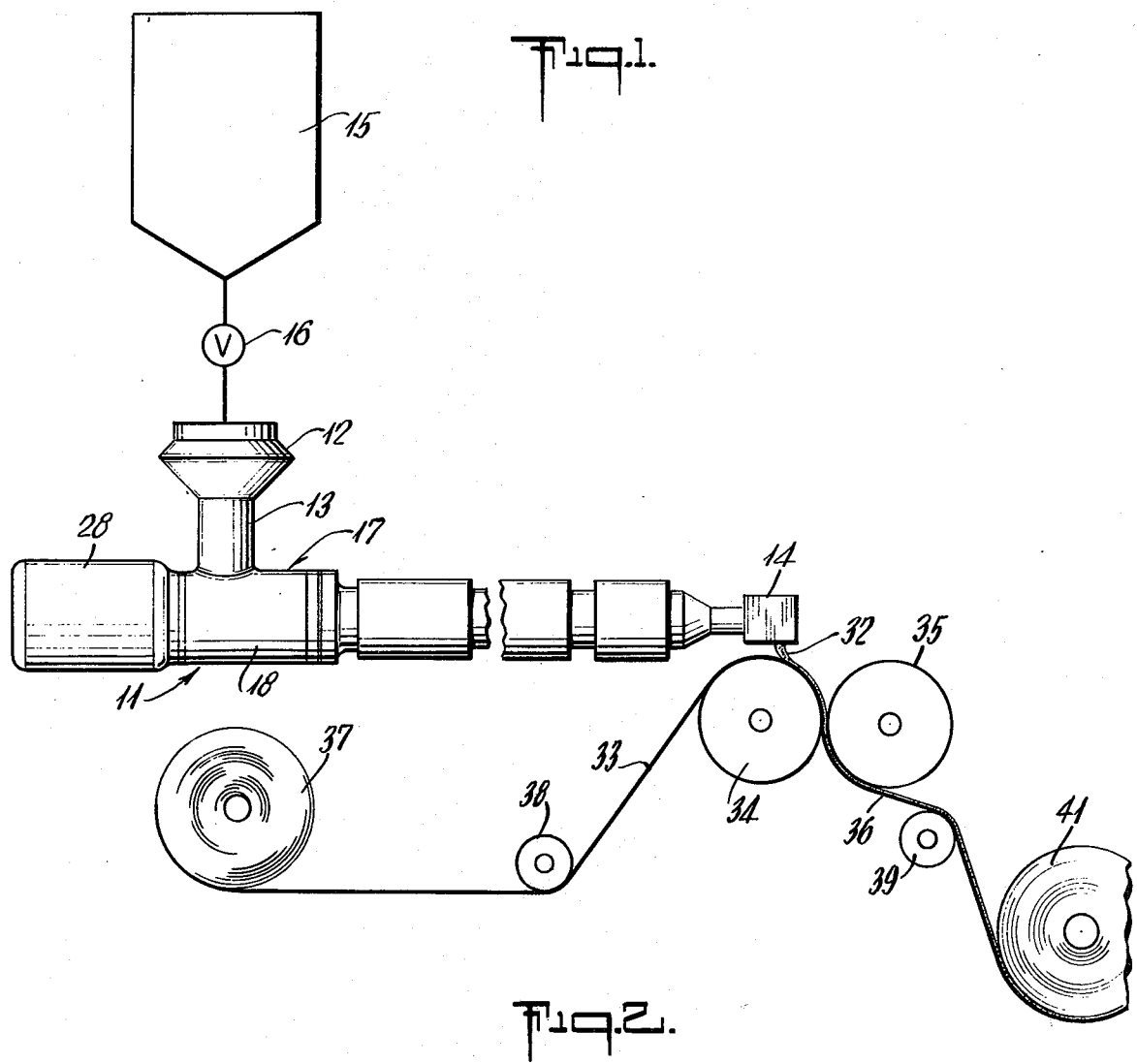
FIG. 1 is a schematic view, partly in elevation and partly in section, of one embodiment of an extruder for practising the process of this invention.

Referring to the drawings, there is shown extrusion apparatus according to the process of this invention which comprises a single screw extruder 11 having an inlet hopper 12 at one end connected to the extruder through a vertical inlet casing 13, and an extrusion die 14 at the other end of the extruder.

A precooled mixture of high molecular weight elastomer particles and low molecular weight resin particles is fed from a feed hopper 15 through a hopper feed control device 16 which meters or controls the rate at which the mixture is fed into the inlet hopper 12 and thence into the inlet portion of the feed section 17 of the extruder through the inlet casing 13.

The inlet casing 13 is integral with a cooling jacket 18 which surrounds the hollow cylindrical barrel 19 of the feed section of the extruder and together with said barrel defines a vertical cylindrical chute 21 through which the particulate mixture is fed into driving contact with a rotating helical extruder screw 22. The feed section of the extruder screw 22 comprises helical flights 23 winding around, and extending radially outward from, an internally heated cylindrical core 24. Successive turns of the helical flights 23 define a helical channel 25 between them which is bounded radially inwardly by the heated core and radially outwardly by the inner cylindrical wall 26 of the barrel 19 of the extruder feed section 17.

Figure 2:
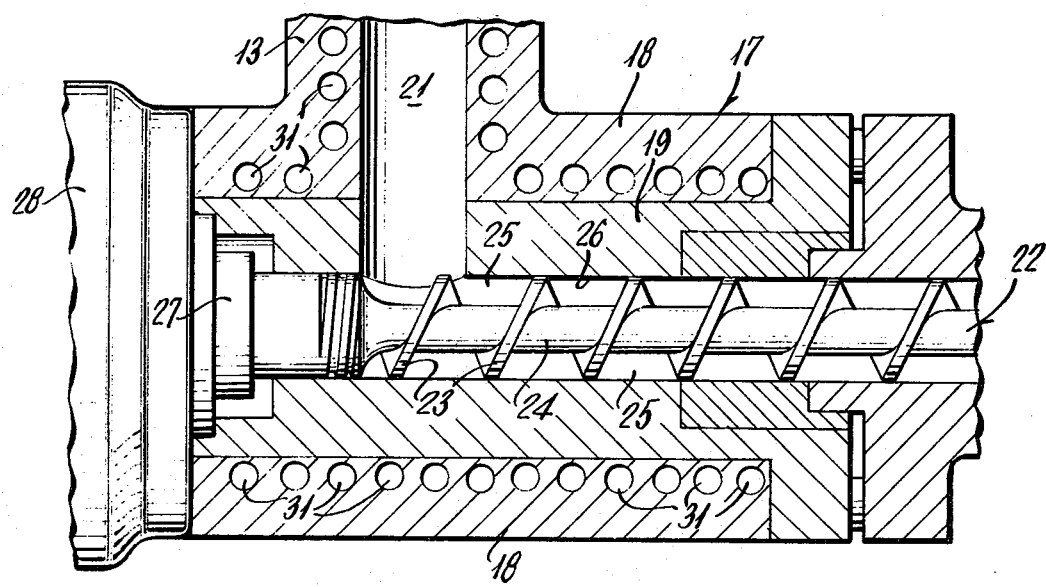
FIG. 2 is an enlarged view, partly in elevation and partly in section longitudinally and vertically through the centerline of the feed section of the extruder and showing the feed section of the extruder screw in elevation.

The extruder screw 22 is driven or rotated clockwise, looking from left to right in FIG. 2, by an extruder drive shaft 27 which, in turn, is rotated at a preselected speed by a conventional electrical extruder drive motor inside an extruder drive housing 28 at one end of the apparatus.

In the embodiment of our process shown in the drawings, all of the constituents of the particulate mixture to be mixed, melted and extruded are preblended in particle form to produce a substantially homogeneous particulate mixture which is supercooled prior to being placed in the feed hopper 15. This supercooling is accomplished by placing batches of the blend in a refrigerator capable of reducing the temperature of the particles to about 0° C. or below, preferably not above about 5° C. Preferably the feed hopper 15 also is cooled by refrigerating coils, not shown, to avoid heating the blend prior to feeding it into the inlet hopper 12.

The precooled particulate mixture substantially fills the helical channel 25 between the flights 23 and is in direct contact with the hot screw which normally is heated within the temperature range of about 250°–400° F. or about 120°–205° C. To assure that the heat from the screw in combination with the heat generated by the shearing forces in the feed section does not heat the particulate mass to the extent that the particles will tend to agglomerate and stick to the screw before the foward axial driving forces generated by the screw on the particles are sufficient to overcome this tendency, the extruder feed section barrel 19 is cooled adjacent the inlet portion of the feed section 17 by liquid refrigerant passing through a series of interconnecting cooling passageways 31 in the feed section cooling jacket 18 and the inlet casing 13 surrounding the barrel. This cooling system maintains the temperature of the outside of the barrel 19 at about the freezing point of water, i.e., not above about 5° C. or about 40° F. Thus the temperature drop from the heated screw 22 to the feed section barrel 19 is in the neighborhood of at least 200° F. This temperature differential tends to draw heat transmitted from the heated extruder screw away from the precooled particles and maintain them cool despite the heat derived from the screw and the heat generated during the process. Thus, the cooled particles are driven axially forward with the screw for more than one, probably several, flight turns of the screw before the particles develop any tendency to agglomerate due to the softening and melting of the lower melting point low molecular weight resin particles. However, at that point in the travel of the particulate mixture the forward axial driving forces on the particles will have increased to the point that these forces will overcome any tendency of the mixture to stick to the screw.

The melting particulate mixture is driven forward in the extruder barrel under substantially steady-state pressure conditions while the mixture is being thoroughly mixed and melted to form a homogeneous melted mass. Then, the melted homogeneous mixture is forced through a transversely extending elongated slot orifice in the die 14 to form a hot sticky thermoplastic elastomeric extrudate sheet or film 32. This hot sticky sheet is drawn from the die into contact with a paper backing sheet 33 passing over a platen roll 34 and thence around a portion of the circumference of this roll and into and through the nip between the platen roll and a press roll 35 to form a laminated structure suitable for use as a normally tacky adhesive tape 36. The backing sheet 33 is drawn from a supply roll 37 around a first guide roller 38 before it contacts the platen roll 34. The platen roll and the press roll 35 normally are driven at the same circumferential linear speed. The surface of the press roll 35 is treated to provide a release surface which does not adhere to the hot sticky extrudate so that the laminate removes easily therefrom after passing around a portion of its circumference. The resulting laminated tape 36 then passes over a second guide roller 39 from which it is wound onto a driven windup roll 41 on which the tape is stored in sheet form.

The following examples are given only by way of illustration and are not intended to limit the scope of the invention in any way. In the examples, all proportions are expressed in parts per one hundred parts by weight of the total elastomers unless otherwise indicated. Table A gives pressure-sensitive adhesive extrudate formulations for Examples I, II and III. In these examples the extrudate is extruded from the die and then drawn down while, at a temperature of about 350°–375° F., to a film thickness of about 1.5–2 mils and then laminated with a conventional creped kraft adhesive tape backing paper about 6 mils thick and passed through the nip between the platen roll and the press roll, as described hereinbefore, to form a laminated sheet according to this invention.

TABLE A

| Ingredient | Examples | | |
|---|---|---|---|
| | I | II | III |
| Kraton 1107 S-I-S Block Copolymer | 100 | | 40 |
| Kraton 1102 S-B-S Block Copolymer | | 100 | |
| Solprene 311X S-I Simple Block Copolymer | | | 60 |

TABLE A-continued

| Ingredient | Examples | | |
|---|---|---|---|
| | I | II | III |
| Wingtack 95 Tackifier Resin | 80 | | 60 |
| Wingtack 76 Tackifier Resin | | 70 | |
| Zinc Dibutyl Dithiocarbamate (Antioxidant) | 2 | 2 | 2 |
| 2,5 Ditertiary Amyl Hydroquinone (Antioxidant) | 0.5 | 0.5 | 0.5 |

Solid block polymer particles are mixed with resin and antioxidant particles to form particulate mixtures or blends in accordance with the above formulations. Prior to blending, the block polymer particles are dusted with approximately 5 percent of their weight of an aluminum hydrate parting agent which prevent sticking to the rubbery material prior to heating.

In the foregoing examples Kraton 1107 copolymer is a thermoplastic elastomeric A-B-A (styrene-isoprene-styrene) block copolymer of this invention offered by the Shell Chemical Company, wherein the styrene content (that of the A blocks) is about 12-15 percent, closer to 15 percent by weight of the block copolymer and the polymer possesses a solution viscosity of about 2,000 centipoises at 25 percent solids in toluene at room temperature (using a Brookfield Viscometer with a No. 4 spindle at 60 r.p.m.), and a number average molecular weight of about 110,000-125,000. Kraton 1102 copolymer is another A-B-A block copolymer offered by Shell but this is a styrene-butadiene-styrene copolymer wherein the styrene blocks constitute about 30 percent of the copolymer. The number average molecular weight of Kraton 1102 copolymer also is about 125,000.

Solprene 311X is a simple A-B (styrene-isoprene) block copolymer offered by Phillips Petroleum Company. It contains about 15 percent styrene, has a number average molecular weight of about 125,000 and possesses a solution viscosity of about 500-800 at 25 percent solids in toluene (using a Brookfield viscosimeter under the conditions stated above).

Wingtack 95 resin is a solid tackifier resin consisting predominantly of polymerized structures derived from piperylene and isoprene, with the ratio of piperylene to isoprene derived structures being at least about 8 or 9 to 1, and with the remainder being derived from mono-olefins. It appears to contain about 12-15 percent unsaturation based upon percentage of units in each molecule having a double bond. The said resin is polymerized from a stream of aliphatic petroleum derivatives in the form of dienes and mono-olefins having 5 or 6 carbon atoms all in accordance with the general teachings of the aforesaid U.S. Pat. No. 3,577,398. This resin possesses a softening point of about 95° C. by the ball and ring method, a number average molecular weight of about 1,100 and is offered commercially by Goodyear Tire and Rubber Company. Wingtack 76 is a similar solid tackifier resin offered by Goodyear which has a ball and ring softening point of about 76° C.

The particulate blends of Examples I-III are precooled by placing batches of the blend in a refrigerator for a period of at least about 12 hours at a temperature of about minus 20° C. or about minus 4° F. This could be considered approximately 0° F. Then the precooled mixture is dumped into the feed hopper from which it is fed into the extruder inlet hopper at a temperature between 0° and 32° F. A Freon refrigerant is pumped through the cooling passageways in the inlet casing and the cooling jacket surrounding the inlet portion of the extruder barrel to cool the outside of the feed section barrel to a temperature of about 0° C. or 32° F. and maintain it at that temperature. The refrigerant is cooled in a conventional manner in a compression refrigeration cycle such as a Carnot cycle. Freon is a trademark of E. I. duPont de Nemours Company.

The extruder screw is heated to a temperature of about 135° C. or 275° F. in the feed section adjacent the extruder inlet. The precooling of the blend and the cooling of the feed section of the barrel to remove heat transmitted from the screw, together with heat generated by extrusion shearing forces, allows the screw to drive the particulate blend or mixture steadily forward without agglomeration or sticking of the particles and without surging of the extrudate at the other end of the extruder. As a result, the mixture is fed forward in the extruder under substantially steady-state pressure conditions while the particles are becoming thoroughly mixed and melted to produce a homogeneous extrudate melt. This melted homogeneous mixture is then forced through the elongated extruder die under substantially uniform pressure and temperature conditions. The result in each case is a hot drawn thin film approximately 1.5-2 mils thick which is laminated to produce a pressure-sensitive adhesive tape as described hereinbefore.

Having now described the invention in specific detail and exemplified the manner in which it may be carried into practice, it will be readily apparent to those skilled in the art that innumberable variations, applications, modifications, and extensions of the basic principles involved may be made without departing from its spirit or scope.

What is claimed is:

1. The process of extruding a thermoplastic elastomeric layer from a mixture of dry particles using a single screw extruder having a helical extruder screw rotating within an extruder barrel having a feed section, which comprises: feeding a mixture of dry particles into an inlet portion of said feed section and into rotative and axial driving contact with said screw, said mixture consisting predominantly of dry thermoplastic elastomer particles and about 20-300 parts per 100 parts by weight of the total elastomer particles of dry resin particles, said elastomer particles having a relatively high molecular weight, said molecular weight being a number average molecular weight of at least about 75,000, and said resin particles having a relatively low molecular weight, said molecular weight being a number average molecular weight of not above about 3,000:
   (a) precooling at least the resin component of said mixture to provide a temperature of said mixture of about 0°C.,
   (b) driving the cooled mixture axially forward with said screw and
   (c) maintaining the temperatures of the particles below that which would cause the mixture to agglomerate and stick to the screw until the axial driving forces on the mixture have increased to the extent they will overcome any tendency of the mixture to stick to the screw, said temperatures being achieved by cooling the barrel adjacent the inlet section sufficiently so that its outer surface is maintained at temperatures below about 5°C.;
feeding said mixture forward in said barrel under substantially steady-state pressure conditions while thoroughly mixing and melting the mixture to cause it to become homogeneous; and passing the melted homogeneous mixture through an elongated extrusion die to form a thermoplastic elastomeric sheet or film not above about 50 mils in thickness.

2. A process according to claim 1, wherein the mixture of dry particles is precooled prior to entering the feed section of the extruder.

3. A process according to claim 1, wherein the helical extruder screw comprises a helical flight winding around a central core and successive turns of said flight define a corresponding helical channel between them which contains said particles, and which further comprises removing heat from the particles in the channel to prevent them from agglomerating by cooling said barrel adjacent the inlet portion of said feed section to a temperature at or below about 0° C. with a refrigerant.

4. A process according to claim 1, wherein said elastomer particles consist essentially of:
   A. at least a major amount by weight of the total elastomer particles of
      1. a linear or radial A—B—A block copolymer wherein the A blocks are derived from styrene and the B blocks are derived from a conjugated diene or a copolymer of ethylene and butylene, or
      2. an A—B block copolymer wherein the A blocks are derived from sytrene and the B blocks are derived from a conjugated diene, or
      3. an ethylene vinyl acetate copolymer, or
      4. a mixture of any of the copolymers from two or more of the categories (1), (2) or (3) above, and
   B. no more than a minor amount by weight of the total elastomer particles of diene rubber elastomers, selected from the group consisting of natural rubbers, synthetic rubbers based on butadiene, isoprene, butadiene-styrene and butadiene-acrylonitrile, and butyl rubber.

5. A process according to claim 4, wherein at least a major amount by weight of the total elastomer particles consist of:
   1. a linear or radial A-B-A block copolymer wherein the A blocks are derived from styrene and the B blocks are derived from a conjugated diene, or
   2. a mixture of an A-B-A block copolymer of category (1) of this claim with 0–300 parts per one hundred parts of the A-B-A block copolymer of the said category (1) of an A-B block copolymer wherein the A blocks are derived from styrene and the B blocks are derived from a conjugated diene.

* * * * *